(12) United States Patent (10) Patent No.: US 12,590,560 B2

Narayanasamy et al. (45) Date of Patent: Mar. 31, 2026

(54) VANE HEATING SYSTEM AND METHOD

(71) Applicant: HONEYWELL INTERNATIONAL INC., Charlotte, NC (US)

(72) Inventors: Karthik Narayanasamy, Phoenix, AZ (US); Dave Dischinger, Phoenix, AZ (US); Sai Manohar Gollakota, Bangalore (IN); Chandiran Jayamurugan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/602,880

(22) Filed: Mar. 12, 2024

(65) Prior Publication Data

US 2025/0243779 A1 Jul. 31, 2025

(30) Foreign Application Priority Data

Jan. 29, 2024 (IN) .............................. 202411005709

(51) Int. Cl.
| | |
|---|---|
| *F02C 7/047* | (2006.01) |
| *F01D 25/02* | (2006.01) |
| *B64D 33/02* | (2006.01) |
| *H05B 3/14* | (2006.01) |
| *H05B 3/18* | (2006.01) |

(52) U.S. Cl.
CPC .............. *F02C 7/047* (2013.01); *F01D 25/02* (2013.01); *B64D 2033/0233* (2013.01); *F05D 2240/12* (2013.01); *H05B 3/14* (2013.01); *H05B 3/18* (2013.01); *H05B 2214/02* (2013.01)

(58) Field of Classification Search
None
See application file for complete search history.

(56) References Cited

U.S. PATENT DOCUMENTS

| | | |
|---|---|---|
| 2,540,472 A | 2/1951 | Winnett et al. |
| 2,742,248 A | 4/1956 | Le Compte et al. |
| | (Continued) | |

FOREIGN PATENT DOCUMENTS

| | | |
|---|---|---|
| CN | 115805181 B | 8/2023 |
| EP | 3738883 A1 | 11/2020 |

OTHER PUBLICATIONS

Harvey et al., Development of Polyisocyanurate Pour Foam, University of Dayton Research Institute, NASA-CR-183511, Abstract p. i and IV. Conclusions pp. 43-44; https://ntrs.nasa.gov/api/citations/19890003374/downloads/19890003374.pdf (Year: 1988).*

*Primary Examiner* — Lorne E Meade
*Assistant Examiner* — Alyson Joan Harrington
(74) *Attorney, Agent, or Firm* — Ingrassia, Fisher & Lorenz LLP

(57) ABSTRACT

A vane heating system for an engine includes a plurality of static vanes, an electrically resistive material, and an electric power source. The static vanes are disposed within the engine, and each static vane has an inner surface that defines a vane cavity. The electrically resistive material is disposed within the vane cavity of each static vane. The electric power source is electrically coupled to, and is configured to selectively supply an electric current to, the electrically resistive material in each static vane. When the electric current is supplied to the electrically resistive material, a temperature of the static vane increases.

9 Claims, 4 Drawing Sheets

(56)                    References Cited

U.S. PATENT DOCUMENTS

| | | | |
|---|---|---|---|
| 10,183,754 | B1 | 1/2019 | Agarwal et al. |
| 11,059,594 | B2 | 7/2021 | Kinlen et al. |
| 11,136,132 | B2 | 10/2021 | Kinlen et al. |
| 11,261,787 | B2 | 3/2022 | Ganiger et al. |
| 11,530,681 | B2 | 12/2022 | Lbker et al. |
| 11,655,828 | B2 | 5/2023 | Zheng et al. |
| 2006/0280600 | A1* | 12/2006 | Euvino, Jr. ............. F02C 7/047 |
| | | | 415/175 |
| 2008/0041842 | A1* | 2/2008 | Alexander ............ F01D 25/162 |
| | | | 219/541 |
| 2009/0242549 | A1* | 10/2009 | Hogate .................. B64D 33/02 |
| | | | 219/635 |
| 2009/0260341 | A1* | 10/2009 | Hogate .................. F01D 25/02 |
| | | | 60/39.093 |
| 2010/0199629 | A1 | 8/2010 | Chene et al. |
| 2010/0326041 | A1 | 12/2010 | Edmondson et al. |
| 2014/0014776 | A1* | 1/2014 | Calder .................. B64D 15/12 |
| | | | 156/64 |
| 2014/0170435 | A1* | 6/2014 | Hui ........................ F01D 5/282 |
| | | | 156/196 |
| 2019/0173147 | A1* | 6/2019 | Yoon ..................... C30B 23/04 |
| 2019/0193862 | A1 | 6/2019 | Kinlen et al. |
| 2020/0140097 | A1* | 5/2020 | Slane .................... B64D 15/12 |

* cited by examiner

VANE HEATING SYSTEM AND METHOD

CROSS REFERENCE TO RELATED APPLICATION

The present application claims benefit of prior filed India Provisional Patent Application No. 202411005709, filed Jan. 29, 2024, which is hereby incorporated by reference herein in its entirety.

TECHNICAL FIELD

The present disclosure relates to engines, such as gas turbine engines and, more particularly, to a vane heating system and method for static vanes within such engines.

BACKGROUND

Many engines, most notably gas turbine engines, include numerous static vanes to direct and improve the air flow within the engine. To further improve the aerodynamic efficiency of the static vanes in particular, and the engine in general, it is desirable to design the static vanes to be very thin. However, a challenge arises when implementing anti-icing/de-icing functionality for these thin static vanes. For example, the wall thicknesses of the thin static vanes may not be compatible with the pressures associated with pneumatic anti-icing/de-icing systems. Although some thought has been given to using electrothermal heaters, this potential solution also exhibits challenges. For example, the thicknesses of the thin static vanes are below the minimum thickness needed to insert and position current commercially available heaters.

Hence, there is a need for a vane heating system for static vanes within engines that does not rely on a pneumatic heat source or one or more electrothermal heaters. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a vane heating system for an engine includes a plurality of static vanes, an electrically resistive material, and an electric power source. The static vanes are disposed within the engine, and each static vane has an inner surface that defines a vane cavity. The electrically resistive material is disposed within the vane cavity of each static vane. The electric power source is electrically coupled to, and is configured to selectively supply an electric current to, the electrically resistive material in each static vane. When the electric current is supplied to the electrically resistive material, a temperature of the static vane increases.

In another embodiment, a gas turbine engine includes a fan section, a compressor section, a combustor section, a turbine section, and an exhaust section. A plurality of static vanes are disposed within the gas turbine engine, and each static vane has an inner surface that defines a vane cavity. An electrically resistive material is disposed within the vane cavity of each static vane. An electric power source is electrically coupled to, and is configured to selectively supply an electric current to, the electrically resistive material in each static vane. When the electric current is supplied to the electrically resistive material, a temperature of the static vane increases.

In yet another embodiment, a method for selectively heating static vanes within an engine, wherein each static vane has an inner surface that defines a vane cavity, includes disposing an electrically resistive material within the vane cavity of each static vane, and selectively supplying an electric current to the electrically resistive material in each static vane via an electric power source that is electrically coupled to the electrically resistive material in each static vane.

Furthermore, other desirable features and characteristics of the vane heating system and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
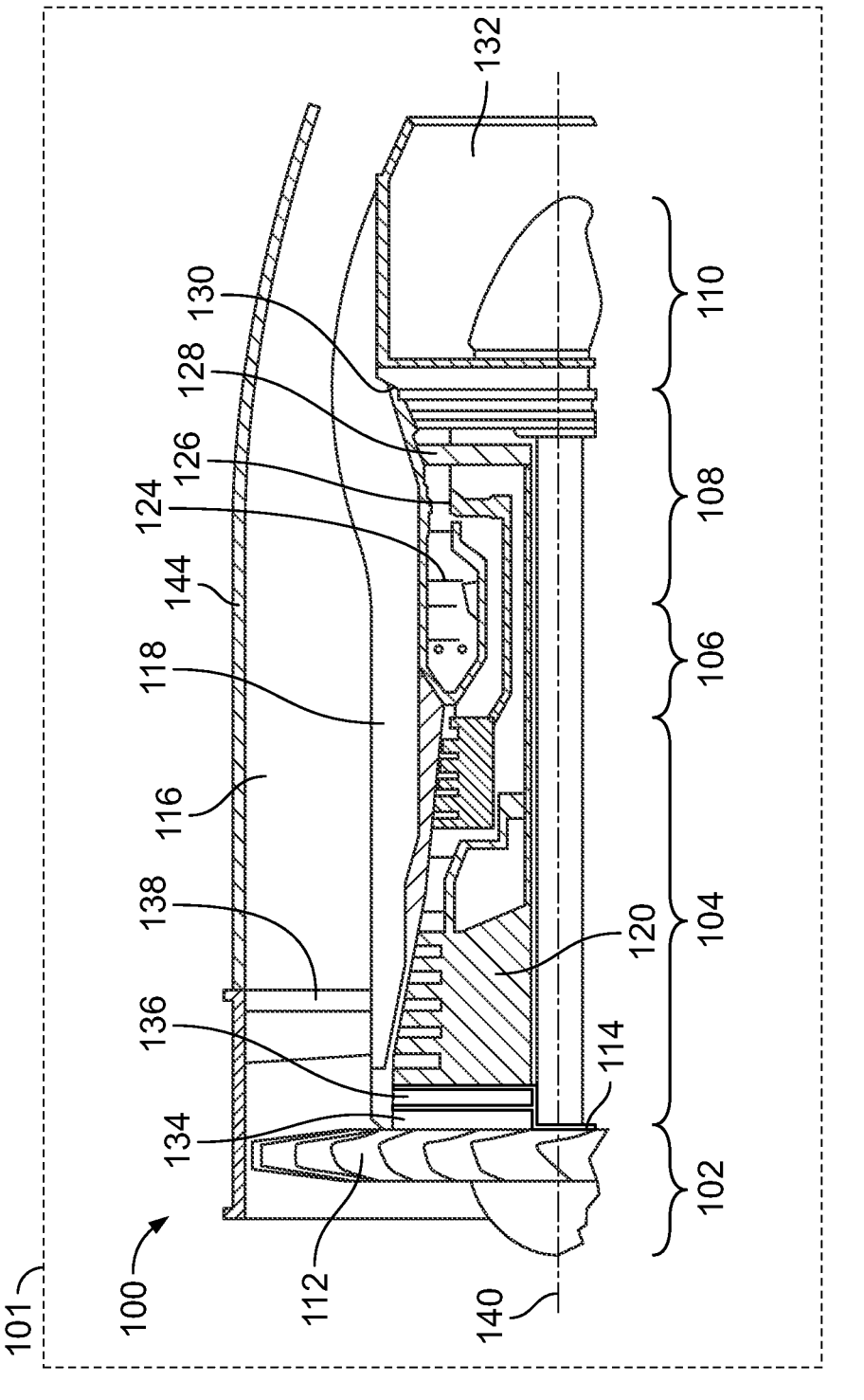
FIG. 1 depicts a simplified cross-sectional view of a portion of one embodiment of a gas turbine engine.

With reference to FIG. 1, a partial, simplified cross-sectional view of one embodiment of a gas turbine engine 100 is depicted. It should be understood that the remaining portion of the gas turbine engine 100 is substantially axisymmetric about a longitudinal axis 140, which also defines an axis of rotation for the gas turbine engine 100. In the depicted embodiment, the gas turbine engine 100 is an annular multi-spool turbofan gas turbine jet engine used to provide propulsion power to an aircraft (represented schematically at 101). It will be appreciated, however, that various features of the present disclosure may be included in various other engine configurations, arrangements, and/or uses. For example, in other embodiments, the gas turbine engine 100 may configured as a non-propulsive engine, such as an auxiliary power unit (APU) deployed onboard the aircraft 101, or as an industrial power generator, or as any one of numerous other turbomachine. Moreover, the gas turbine engine may be used in various contexts, from aerial vehicles (both manned and unmanned), terrestrial vehicles, waterborne vehicles, or space vehicles.

In the depicted embodiment, the gas turbine engine 100 includes a fan section 102, a compressor section 104, a combustor section 106, a turbine section 108, and an exhaust section 110. In one example, the fan section 102 includes a fan 112 mounted on a rotor 114 that draws air into the gas turbine engine 100 and compresses it. A fraction of the compressed air exhausted from the fan 112 is directed through the outer bypass duct 116 and the remaining fraction of air exhausted from the fan 112 is directed into the compressor section 104. The outer bypass duct 116 is generally defined by an outer casing 144 that is spaced apart from and surrounds an inner bypass duct 118.

In the embodiment of FIG. 1, the compressor section 104 includes one or more compressors 120. The number of compressors 120 in the compressor section 104 and the configuration thereof may vary. The one or more compressors 120 sequentially raise the pressure of the air and direct a majority of the high-pressure fluid or air into the combustor section 106. In the combustor section 106, which includes a combustion chamber 124, the high-pressure air is mixed with fuel and the fuel-air mixture is combusted. The high-temperature combustion air or combustive gas flow is directed into the turbine section 108.

In the depicted embodiment, the turbine section 108 includes three turbines disposed in axial flow series, namely, a high-pressure turbine 126, an intermediate pressure turbine 128, and a low-pressure turbine 130. However, it will be appreciated that the number of turbines, and/or the configurations thereof, may vary. In this embodiment, the high-temperature combustion air from the combustor section 106 expands through and rotates each turbine 126, 128, and 130. The combustion air then exits the turbine section 108 for mixture with the cooler bypass airflow from the outer bypass duct 116 and is ultimately discharged from the gas turbine engine 100 through the exhaust section 132. As the turbines 126, 128, 130 rotate, each drives equipment in the gas turbine engine 100 via concentrically disposed shafts or spools.

The depicted gas turbine engine 100 also includes one or more sets of static vanes. The static vanes are configured to direct and/or straighten the portion of the compressed air that is discharged from the fan 112. In the depicted embodiment, the gas turbine engine includes two sets of static vanes—a set of booster inlet guide vanes 134 and a set of booster exhaust guide vanes 136. Before proceeding further, it should be noted that the depicted gas turbine engine 100 may also include other sets of static vanes, which may be disposed at various other positions within the gas turbine engine 100. For example, the depicted engine also includes a set of bypass duct guide vanes 138, which are disposed within the outer bypass duct 116 downstream of the fan 112. Moreover, other gas turbine engines may not include the booster inlet guide vanes 134 and/or the booster exhaust guide vanes 136 at all, but may include one or more sets of static vanes at various other positions. Nonetheless, the techniques described further herein may be implemented in stator vanes disposed at varied locations.

Figure 2:
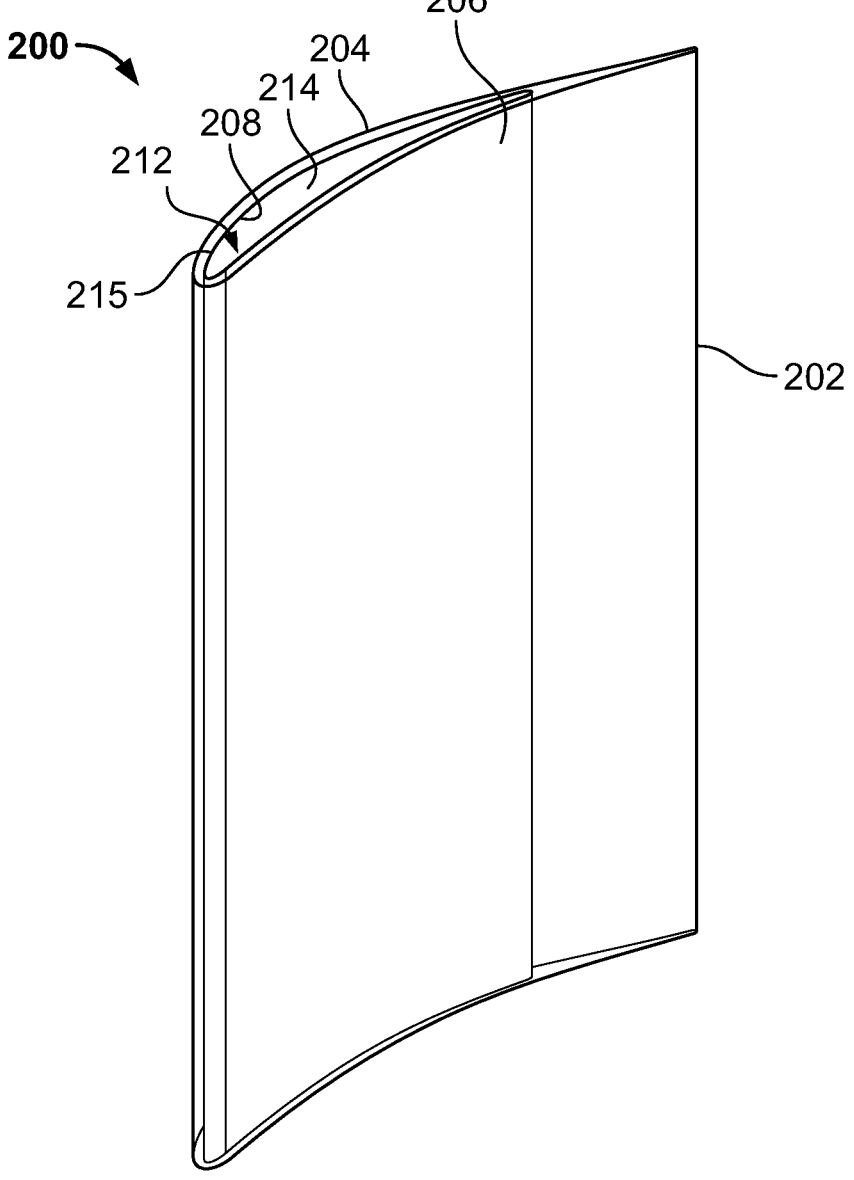
FIG. 2 a plan view of one embodiment of a static vane that may be included in the engine of FIG. 1.

Returning now to the description, each static vane 200, one of which is depicted in FIG. 2, includes a main body 202 having a suction side wall 204, a pressure side wall 206, and an inner surface 208 that defines a vane cavity 212 within at least a portion of the main body 202. The suction side wall 204 is disposed to face away from the incoming air flow, and the oppositely disposed pressure side wall 206 is disposed to face toward the incoming air flow. Though not depicted, the static vanes 200 are coupled to and supported by a support structure.

The static vanes 200, which may be constructed of a metal or a composite material, are designed to be very thin. For example, in some embodiments the maximum thickness between the suction side wall 204 and the pressure side 206 may be approximately 1.5 millimeters. Thus, as FIG. 2 further depicts, to implement a vane heating system 300 (see FIG. 3), to thereby facilitate anti-icing/de-icing capability of the static vanes 200, an electrically resistive material 214 is disposed within the vane cavity 212 of each static vane 200. Preferably, a thin electrically insulative material 215, such as, for example, PTFE (Polytetrafluoroethylene)/Teflon), aluminum nitride, boron nitride, or various other ceramic coatings, just to name a few non-limiting examples, is disposed between the electrically resistive material 214 and the inner surface 208. As may be appreciated, each vane cavity 212 has a fillable volume. Although the electrically resistive material 214 may, at least in some embodiments, be disposed in only a portion of the fillable volume, in a particular preferred embodiment, the electrically resistive material 214 fills the entire fillable volume. It will additionally be appreciated that the composition of the electrically resistive material 214 may vary. In one particular embodiment, however, it comprises polydimethylsiloxane (PDMS) and polymethylmethacrylate (PMMA) and, at least in some embodiments, further comprises graphene. Depending on the particular composition, the electrically resistive material 214 is poured into the vane cavity 212 and then cured. The electrically resistive material 214 may also, depending on the particular composition, exhibit some elastic properties to withstand the vibrations the static vanes 200 may experience.

Figure 3:
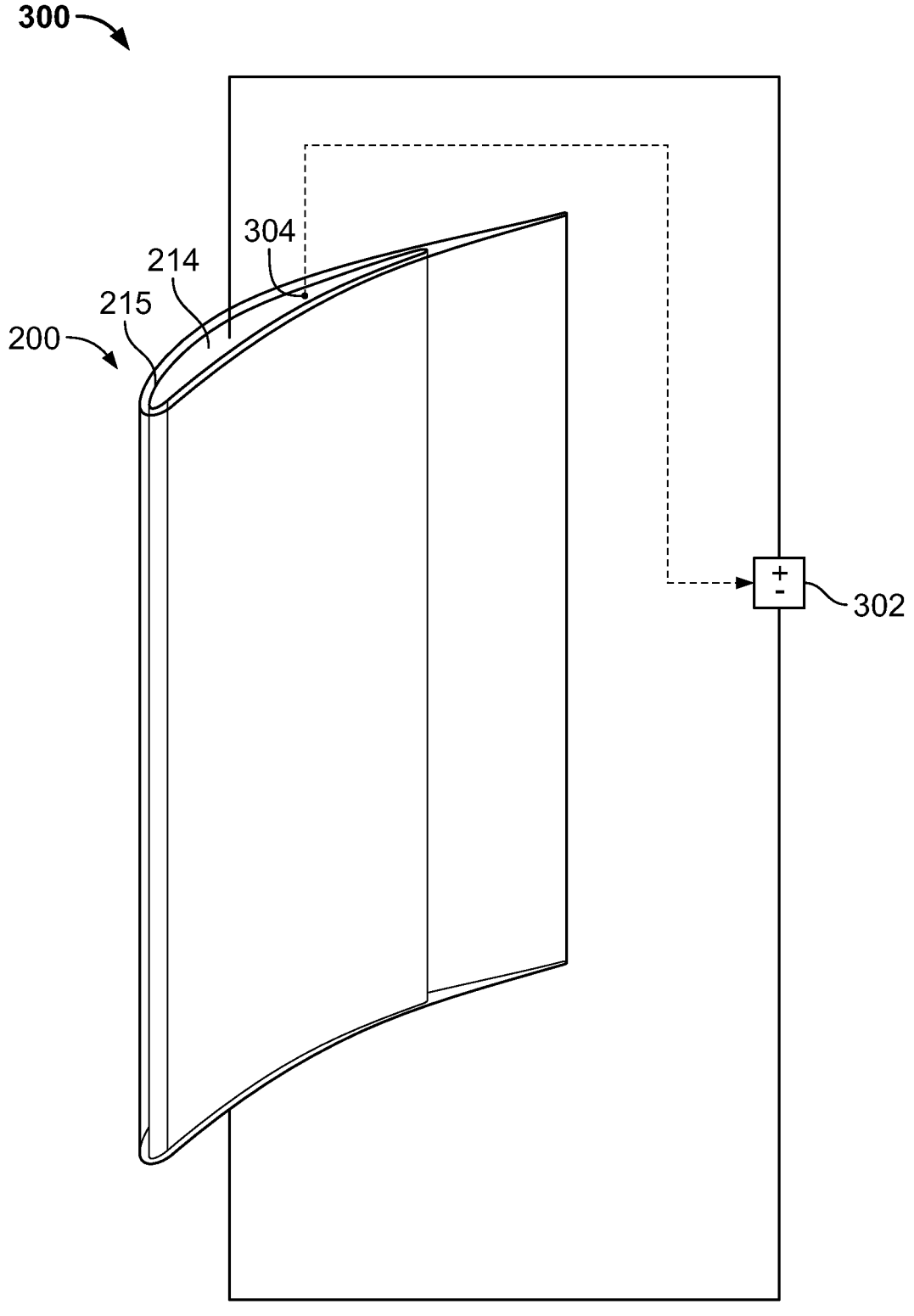
FIG. 3 depicts a schematic diagram of a portion of a vane heating system.

Turning now to FIG. 3, it is seen that the vane heating system 300 includes an electric power source 302. The electric power source 302 is electrically coupled to the electrically resistive material 214 in each vane cavity 212 and is configured to selectively supply an electric current to the electrically resistive material 214 in each vane cavity 212. As may be appreciated, when the electric current is supplied to the electrically resistive material 214, the temperature of the static vane 200 increases, thereby providing the anti-icing/de-icing capability. As may also be appreciated, the electric power source 302 may be variously implemented. For example, it may be implemented using a battery or any one of numerous types of circuit-based power sources. The electric power source 302 may also be implemented as a dedicated power source or as a power source presently implemented in another system.

Regardless of how the electric power source 302 is specifically implemented, the vane heating system 300 may also include, at least in some embodiments, a plurality of temperature sensors 304. Each temperature sensor 304, when included is coupled to one of the static vanes 200. In some embodiments, there may be a temperature sensor 304 coupled, one each, to a different one of the static vanes 200. In some embodiments, each temperature sensor 304 is coupled to a static vane 200 by disposing the temperature sensor 304 within the vane cavity 212 and then pouring the electrically resistive material 214 into the vane cavity 212. It will be appreciated, however, that other techniques could also be used. For example, the temperature sensors 304 may be implemented using a non-contact type of sensor, such as an optical sensor.

Each temperature sensor 304 is configured to sense the temperature of the static vanes 200 to which it is coupled, and to supply a sensor signal indicative of the sensed temperature. In these embodiments, the electric power source 302 is coupled to receive the sensor signals from each temperature sensor 304 and is further configured, in the response to the sensor signals, to selectively supply the electric current, thereby being able to regulate the heat generated by the electrically resistive material 214. The temperature sensors 304, when included, may be implemented using any one of numerous types of contact or non-contact temperature sensors such as, for example, a thermocouple, a resistance temperature detector (RTD), or an optical detector, just to name a few.

Figure 4:
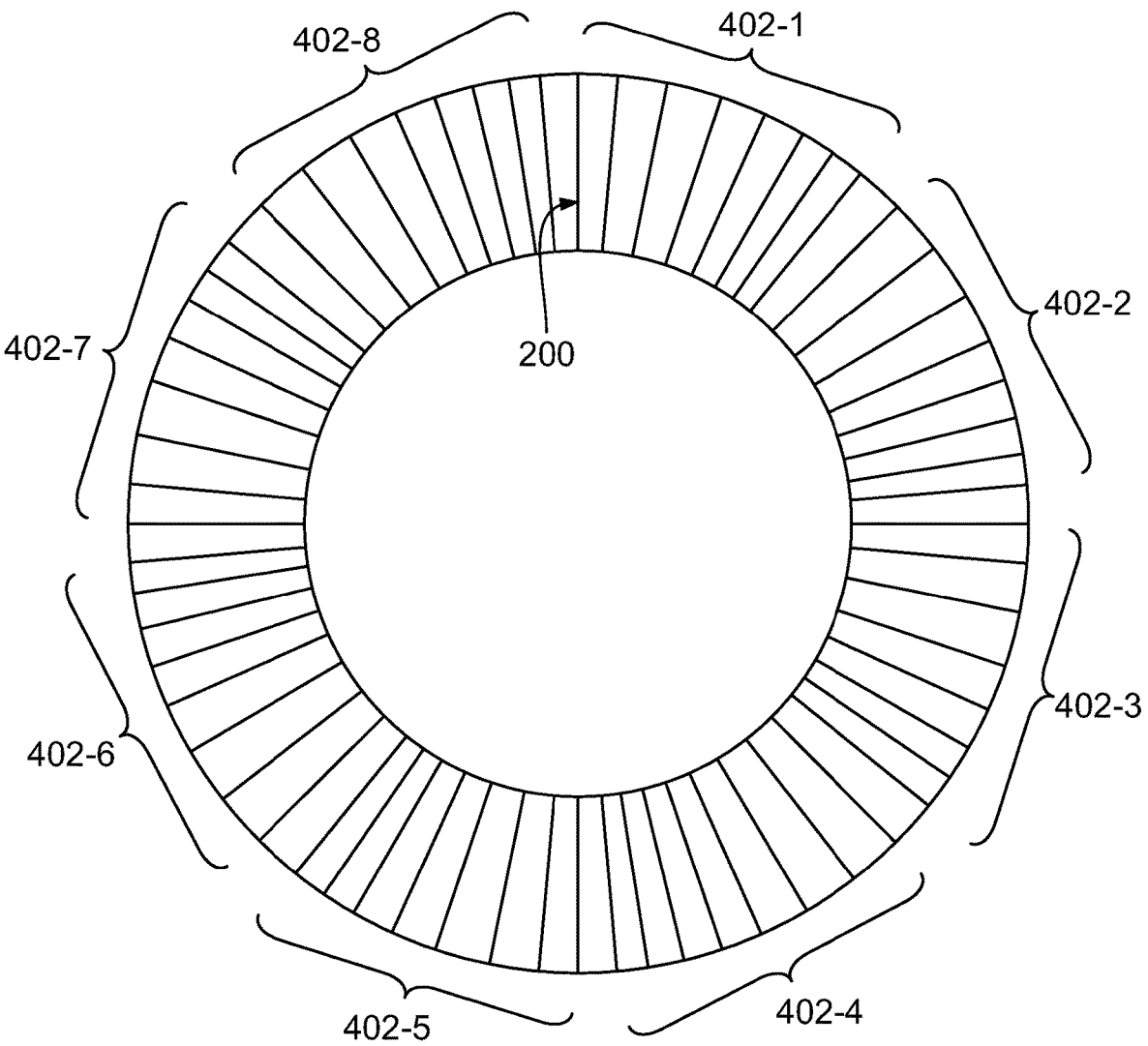
FIG. 4 depicts a front view of a simplified representation of a structure that may include a plurality of the static vanes depicted in FIG. 2.

While in some embodiments it may be desirable to simultaneously heat all of the static vanes 200 (as required), in other embodiments it may be desirable to simultaneously heat only a portion of the static vanes 200 at a time. For example, and as illustrated in FIG. 4, in some configurational embodiments, the plurality of static vanes 200 may be divisible into a plurality of sets of static vanes, in which each set of static vanes has a predetermined number of static vanes 200. In the simplified example embodiment depicted in FIG. 4, there are 64 static vanes 200, which are divided, for example, into 8 sets 402 (e.g., 402-1, 402-2, 402-3, . . . 402-8) of static vanes. Thus, each set 402 has 8 static vanes 200. In this embodiment, the electric power source 302 is preferably configured to selectively supply electric current to each static vane 200 in each set 402 of static vanes, one set at a time. For example, the electric power source 302 may supply electric current to each static vane 200 in the first set 402-1 for a predetermined time period (e.g., 1 second), and then supply electric current to each static vane 200 in the second set 402-2 for the predetermined time period, and then supply electric current to each static vane 200 in the third set 402-3 for the predetermined time period, and so on. With this technique, the overall power requirement of the electric power source can be reduced, relative to an embodiment in which all of the static vanes 200 are simultaneously energized.

Though not shown in FIG. 4, it will be appreciated that in this embodiment rather than coupling a temperature sensor 302 to each static vane 200, a temperature sensor 304 may be coupled to only one of the static vanes 200 in each set 402 of static vanes. Thus, the vane heating system 300 would include only 8 temperature sensors 304. With this configuration, the electric power source 302 is configured to selectively supply the electric current to each static vane 200 in each set 402 of static vanes, one set at a time (as just described), in the response to the sensor signals supplied from the temperature sensors 306.

It should be noted that, although the vane heating system 300 is depicted and described herein in the context of a gas turbine engine, it may be implemented in various other environments that may include relatively thin static vanes and that may need anti-icing/de-icing functionality. For example, it may be implemented in electric propulsion motors and/or on the relatively thin propeller blades for urban air mobility (UAM) and/or unmanned air vehicle (UAV) aircraft, just to name a few.

The vane heating system described herein does not rely on a pneumatic heat source or one or more electrothermal heaters. In addition, the electrically resistive material not only provides for heating, but also increases the structural strength of the static vanes and does so with minimal weight addition. The techniques described herein does not rely on any moving parts, is highly reliable, and is less likely to be subject to foreign object damage and/or erosion.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A vane heating system for an engine, comprising:
   a plurality of static vanes disposed within the engine, each static vane having an inner surface that defines a vane cavity;
   an electrically resistive material disposed within the vane cavity of each static vane; and
   an electric power source electrically coupled to, and configured to selectively supply an electric current to, the electrically resistive material in each static vane,
   wherein, when the electric current is supplied to the electrically resistive material, a temperature of the static vane increases,
   wherein:
      each vane cavity has a fillable volume;
      the electrically resistive material consists essentially of polydimethylsiloxane (PDMS), polymethylmethacrylate (PMMA) and graphene that is poured into the vane cavity of each static vane and is then cured;
      the electrically resistive material fills an entirety of the fillable volume and increases the structural strength of each static vane; and
      an electrically insulative material is disposed between the inner surface of each static vane and the electrically resistive material.

2. The vane heating system of claim 1, wherein:
   the system further comprises a plurality of temperature sensors, each temperature sensor configured to sense a temperature of one of the plurality of static vanes and supply a sensor signal indicative of the sensed temperature; and
   the electric power source is coupled to receive the sensor signals from each temperature sensor and is further configured, in the response to the sensor signals, to selectively supply the electric current.

3. The system of claim 1, wherein:
   the plurality of static vanes are divisible into a plurality of sets of static vanes, each set of static vanes having a predetermined number of static vanes; and
   the electric power source is further configured to selectively supply the electric current to the predetermined number of static vanes in each set of static vanes, one set at a time.

4. The system of claim 3, wherein:
   the system further comprises a plurality of temperature sensors, each temperature sensor configured to sense a temperature of one static vane in each set of static vanes and supply a sensor signal indicative of the sensed temperature; and
   the electric power source is coupled to receive the sensor signals from each temperature sensor and is further configured, in the response to the sensor signals, to selectively supply the electric current to the predetermined number of static vanes in each set of static vanes, one set at a time.

5. A gas turbine engine, comprising:

a fan section, a compressor section, a combustor section, a turbine section, and an exhaust section;

a plurality of static vanes disposed within the gas turbine engine, each static vane having an inner surface that defines a vane cavity;

an electrically resistive material disposed within the vane cavity of each static vane; and an electric power source electrically coupled to, and configured to selectively supply an electric current to, the electrically resistive material in each static vane, wherein, when the electric current is supplied to the electrically resistive material, a temperature of the static vane increases, and wherein:

each vane cavity has a fillable volume;

the electrically resistive material consists essentially of polydimethylsiloxane (PDMS), polymethylmethacrylate (PMMA) and graphene that is poured into the vane cavity of each static vane and is then cured;

the electrically resistive material fills an entirety of the fillable volume and increases the structural strength of each static vane; and an electrically insulative material is disposed between the inner surface of each static vane and the electrically resistive material.

6. The gas turbine engine of claim 5, wherein:

the system further comprises a plurality of temperature sensors, each temperature sensor configured to sense a temperature of one of the plurality of static vanes and supply a sensor signal indicative of the sensed temperature; and the electric power source is coupled to receive the sensor signals from each temperature sensor and is further configured, in the response to the sensor signals, to selectively supply the electric current.

7. The gas turbine engine of claim 5, wherein:

the plurality of static vanes are divisible into a plurality of sets of static vanes, each set of static vanes having a predetermined number of static vanes; and the electric power source is further configured to selectively supply the electric current to the predetermined number of static vanes in each set of static vanes, one set at a time.

8. The gas turbine engine of claim 7, wherein:

the system further comprises a plurality of temperature sensors, each temperature sensor configured to sense a temperature of one static vane in each set of static vanes and supply a sensor signal indicative of the sensed temperature; and the electric power source is coupled to receive the sensor signals from each temperature sensor and is further configured, in the response to the sensor signals, to selectively supply the electric current to the predetermined number of static vanes in each set of static vanes, one set at a time.

9. A vane heating system for an engine, comprising:

a plurality of static vanes disposed within the engine, each static vane having an inner surface that defines a vane cavity;

an electrically resistive material disposed within the vane cavity of each static vane; and an electric power source electrically coupled to, and configured to selectively supply an electric current to, the electrically resistive material in each static vane, wherein, when the electric current is supplied to the electrically resistive material, a temperature of the static vane increases, wherein:

each vane cavity has a fillable volume;

the electrically resistive material consists essentially of polydimethylsiloxane (PDMS), polymethylmethacrylate (PMMA) and graphene that is poured into the vane cavity of each static vane and is then cured;

the electrically resistive material fills an entirety of the fillable volume and increases the structural strength of each static vane;

an electrically insulative material is disposed between the inner surface of each static vane and the electrically resistive material;

the plurality of static vanes are divisible into a first predetermined number of sets of static vanes;

each of the sets of static vanes having an equal number of static vanes;

the system further comprises a second predetermined number of temperature sensors, the second predetermined number equal to the first predetermined number;

each of the sets of static vanes has only one static vane to which a respective one of the temperature sensors is coupled;

each temperature sensor is configured to sense a respective temperature of the respective only one static vane to which the temperature sensor is coupled and supply a sensor signal indicative of the sensed respective temperature; and the electric power source is coupled to receive the sensor signal from each temperature sensor and is further configured, in response to the sensor signals, to selectively supply the electric current to the equal number of static vanes in each of the sets of static vanes, one set at a time.

*　*　*　*　*